Oct. 5, 1948.                    C. W. CULDICE                    2,450,502
                        NONHIDE CUTTING FLESHING TOOL
                            Filed Nov. 6, 1946
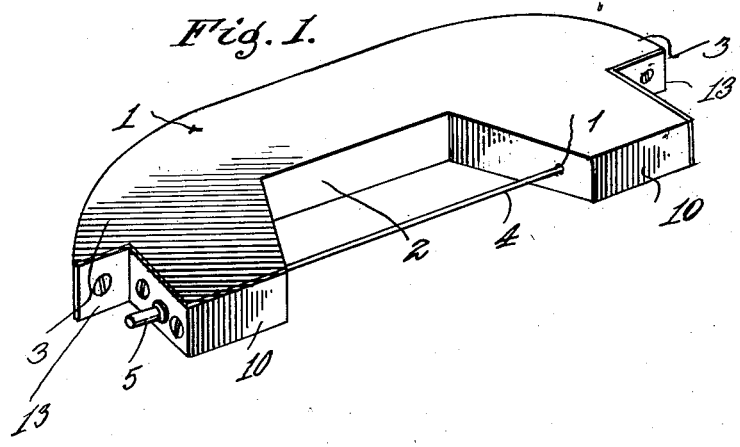
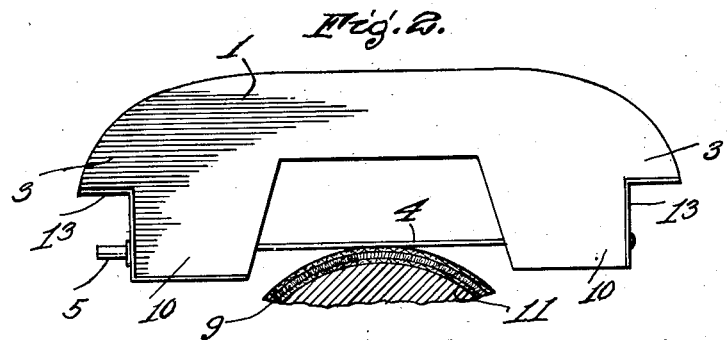
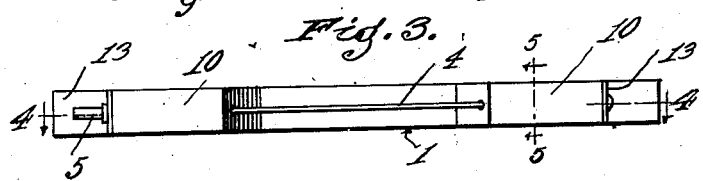
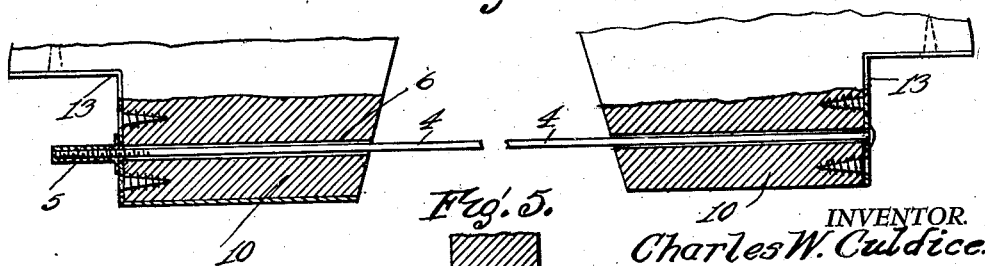
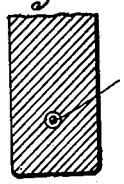
INVENTOR.
Charles W. Culdice.
BY Victor J. Evans & Co.
ATTORNEYS Patented Oct. 5, 1948

2,450,502

UNITED STATES PATENT OFFICE 2,450,502

NONHIDE CUTTING FLESHING TOOL

Charles W. Culdice, Wentworth, Wis.

Application November 6, 1946, Serial No. 708,150

1 Claim. (Cl. 69—20)

This invention relates to a tool for fleshing and removing the fat from fur bearing animals.

It is an object of the invention to provide a tool which has a round steel wire which does not scrape the leather and enables faster work because it does not have the usual resistance of scraping tools.

A further object is the provision of a tool for fleshing and removing fat from fur bearing animals, which tool has a round steel wire that cuts fat from leather and does not push the fat ahead of it, as is the case when fleshing skins with knives and the like.

These and other objects are attained by the novel construction as hereinafter described and illustrated by the accompanying drawings, forming a part hereof, and in which:

Fig. 1 is a perspective view of a fleshing device embodying the invention.

Fig. 2 is a plan view of the device.

Fig. 3 is an end view of the device.

Fig. 4 is a sectional view taken on the line 4—4 of Fig. 3.

Fig. 5 is a sectional view taken on the line 5—5 of Fig. 3.

Referring to the drawings, the fleshing tool is shown to comprise a block 1 having a cut out portion 2 to produce a U-shaped figure with side hand grips 3. Through the legs 10 of the body 1 passes a steel wire 4, one end of which is threaded and cooperates with a nut 5 for tightening purposes. The wire passes through holes 6 in one of the legs 10, there being several holes for adjusting the device for various sizes of skins.

In operation, a pelt 9 is placed on a rotary pole or staff 11, and the block 1 is grasped with both hands with the round steel wire 4 placed in contact with the pelt, and by exerting pressure on the tool with a downward motion the fat and flesh is cut from the pelt.

The ends of the block 1 are backed by metal angles 13, secured to the block by screws.

It will be seen that there has been provided a simple and effective device for removing flesh and fat from pelts, without having the flesh and fat crowding in front of the cutting instrument.

The above description is to be considered as illustrative and not limitative of the invention of which modifications can be made without departing from the spirit and scope of the invention as set forth in the appended claim.

The invention having been described, what is claimed is:

A hand tool for fleshing pelts, comprising a block having a cut out center portion to form a substantially V-shaped frame, the rear edge of said frame being curved to form hand holds at each outer end of said frame, means secured to said legs for the bracing thereof, a wire passing through the legs of the frame and the bracing means thereon, one end of the wire being threaded, and a threaded nut engaging the threaded end of the wire for tightening purposes.

CHARLES W. CULDICE.

REFERENCES CITED

The following references are of record in the file of this patent:

UNITED STATES PATENTS

| Number | Name | Date |
|---|---|---|
| 890,351 | Frank | June 9, 1908 |
| 1,111,373 | Givulinovich | Sept. 22, 1914 |